US007740719B2

(12) United States Patent
Arai et al.

(10) Patent No.: US 7,740,719 B2
(45) Date of Patent: Jun. 22, 2010

(54) CUTTER COMPOSED OF NI-CR ALLOY

(75) Inventors: Tomohisa Arai, Yokohama (JP); Takashi Rokutanda, Yokohama (JP); Tadaharu Kido, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 613 days.

(21) Appl. No.: 10/514,196

(22) PCT Filed: May 14, 2003

(86) PCT No.: PCT/JP03/06025

§ 371 (c)(1), (2), (4) Date: Nov. 12, 2004

(87) PCT Pub. No.: WO03/097887

PCT Pub. Date: Nov. 27, 2003

(65) Prior Publication Data

US 2005/0167010 A1 Aug. 4, 2005

(30) Foreign Application Priority Data

May 15, 2002 (JP) ............................ 2002-140667

(51) Int. Cl.
*C22C 19/05* (2006.01)
*B26B 27/00* (2006.01)
*B23D 31/00* (2006.01)

(52) U.S. Cl. ......................... 148/428; 30/165; 420/443; 420/445; 420/452; 420/455; 420/457; 420/459; 420/460

(58) Field of Classification Search ................. 148/428, 148/905, 482; 420/443, 445, 452, 455, 457, 420/459, 460; 30/165
See application file for complete search history.

(56) References Cited

U.S. PATENT DOCUMENTS

| | | | | |
|---|---|---|---|---|
| 840,213 | A | 1/1907 | Holoubek | |
| 2,938,787 | A | 5/1960 | Boyd et al. | |
| 3,015,558 | A * | 1/1962 | Grant et al. | 420/445 |

(Continued)

FOREIGN PATENT DOCUMENTS

EP 0 247 577 A 12/1987

(Continued)

OTHER PUBLICATIONS

"Material Hardness" copyright 2001 by CALCE and the University of Maryland. pp. 1 and 24. from website http://www.calce.umd.edu/general/Facilities/Hardness_ad_.htm.*

(Continued)

*Primary Examiner*—George Wyszomierski
*Assistant Examiner*—Tima M McGuthry-Banks
(74) *Attorney, Agent, or Firm*—Foley & Lardner LLP

(57) ABSTRACT

A cutter is composed of a Ni—Cr alloy containing from 32 to 44 mass percent of Cr, from 2.3 to 6.0 mass percent of Al, the balance being Ni, impurities, and additional trace elements and having a Rockwell C hardness of 52 or more. This Ni—Cr alloy provides a cutter produced with a superior workability and by a significantly simplified process, having a low deterioration in the hardness even when heated in use, having excellent corrosion resistance and low-temperature embrittlement resistance, and satisfactorily maintaining the cutting performance for a long time.

1 Claim, 7 Drawing Sheets

U.S. PATENT DOCUMENTS

| | | | | | |
|---|---|---|---|---|---|
| 3,890,816 | A * | 6/1975 | Allen et al. | .................... | 75/255 |
| 4,155,782 | A | 5/1979 | Shimotori et al. | | |
| 4,400,349 | A * | 8/1983 | Kudo et al. | .................. | 420/443 |
| 4,798,633 | A * | 1/1989 | Martin et al. | ............... | 148/675 |
| 5,141,704 | A | 8/1992 | Kondo et al. | | |
| 5,225,009 | A | 7/1993 | Orikasa et al. | | |
| 5,374,323 | A | 12/1994 | Kuhlman et al. | | |
| 5,529,642 | A * | 6/1996 | Sugahara et al. | ............ | 148/427 |
| 5,939,204 | A * | 8/1999 | Czech | ........................ | 428/469 |
| 6,503,345 | B1 * | 1/2003 | Klarstrom | ................... | 148/410 |

FOREIGN PATENT DOCUMENTS

| | | | |
|---|---|---|---|
| EP | 0 648 850 | A1 | 4/1995 |
| JP | 59-40902 | B2 | 10/1984 |
| JP | 64-73059 | A | 3/1989 |
| JP | 1-156445 | A | 6/1989 |
| JP | 06 172900 | A | 6/1994 |
| JP | 10-127957 | A | 5/1998 |
| JP | 2001-62594 | A | 3/2001 |
| JP | 2001-62595 | A | 3/2001 |
| JP | 2002-88431 | A | 3/2002 |

OTHER PUBLICATIONS

English translation of JP 01-156445, published Jun. 1989.*

ASTM E140-07 (2007).*

The Metals Handbook, $10^{th}$ Edition, vol. 1, ASM International, 1990, pp. 1027-1028.*

Hertzberg, Richard W., Deformation and Fracture Mechanics of Engineering Materials, $4^{th}$ Edition, John Wiley & Sons, Inc., 1996, pp. 129-130.*

Tomohisa Arai, U.S. PTO Office Action, U.S. Appl. No. 12/185,494, dated May 22, 2009, 12 pages.

T. Arai, USPTO Notice of Allowance and Allowability, U.S. Appl. No. 12/185,494, dated Nov. 17, 2009, 7 pages.

* cited by examiner

CUTTER COMPOSED OF NI-CR ALLOY

TECHNICAL FIELD

The present invention relates to a cutter (cutting tool) composed of a Ni—Cr alloy, capable of significantly simplifying a process of manufacturing the cutter, and in particular, to a cutter composed of a Ni—Cr alloy produced with a superior workability, having a low deterioration in the hardness even when heated in use, having excellent corrosion resistance and low-temperature embrittlement resistance, and satisfactorily maintaining the cutting performance for a long time of period.

BACKGROUND ART

In general, alloy materials such as carbon tool steels, high-speed steels, and high-carbon martensitic stainless steels are widely used as blade materials of cutters, for example, in addition to knives for meals and foods, cooking knives, and camping knives (field service knife, outdoor knife); scissors, ice picks, cutters for food machines, cutters for cutting frozen foods, paper cutters, cutters for perforating a plastic package of, for example, tablets, cutters for medical use (surgical knives, chisels, and scissors), and cutters for cutting plastics. Titanium alloys are also used as a material of cutters for special purposes.

Although ingots prepared by melting raw materials and solidifying the molten materials are generally used as the alloy materials for constituting the above cutters, alloy materials produced by powder metallurgy are also partly used. Except for the above titanium alloys for special purposes, as will be described later, knives, i.e., cutters (cutting tools) composed of the above alloy materials are generally produced as follows: A steel blank is formed to have a knife shape. The formed body is then subjected to heat treatment so that carbides having high hardness are finely dispersed and precipitated in the martensitic structure. This process provides the knives i.e., cutters, with the hardness required for the cutters.

For example, Japanese Unexamined Patent Application Publication No. 10-127957 discloses a knife for meals as an example of the above cutters. The knife is produced by welding a blade part composed of an austenitic stainless steel including predetermined contents of C, Si, Mn, P, S, Ni, Cr, Mo, N, and the balance Fe, and in addition, having a Vickers hardness (Hv) of at least 450 with a metallic grip part. In addition to the above example, cutters composed of an iron-based alloy material such as a martensitic stainless steel have been also widely used.

A method for producing a knife will now be specifically described with reference to an example of a knife. The knife is composed of an iron-based alloy material, for example, a martensitic stainless steel, which is the most versatile and in widespread use.

FIG. 8 includes perspective views showing a process for producing a known knife composed of a stainless steel. The knife composed of a stainless steel is generally produced by processing a plate 1 composed of a martensitic stainless steel, which can be hardened by quenching. When such an iron-based alloy material is used, the plate 1 is annealed in advance to facilitate the machining (machine work). Subsequently, the plate 1 is cut by punching to form a formed body 3 having a predetermined shape. This machining provides the cutter shape at normal temperature. The plate 1 is processed by cutting, grinding, and polishing or by hot forging to form a near net shape of the cutter, thus forming a cutter blank (tool raw material) 4. At the handle part (grip portion), grip-fixing holes 2 are formed by, for example, a drilling machine.

Subsequently, the processed cutter blank 4 is heated up to the predetermined quenching temperature, kept at the temperature for the predetermined time, and then quenched to provide the predetermined hardness. In general, carbon steels for cutters are heated in air, and other metallic materials are heated in a vacuum, in an inert gas atmosphere, or in a non-oxidizing atmosphere. The carbon steels or the other metallic materials are kept in an adequate temperature range, which depends on the kind of the alloy material, for the predetermined time, and then hardened by quenching.

The quenching temperature is different depending on the kind of the material. The quenching temperature of carbon steels is from 700° C. to 900° C. and that of stainless steels is from about 950° C. to about 1,100° C. The optimum temperature range is from 40° C. to 50° C. Water quenching, oil quenching, and forced air-cooling are used for the quenching according to the kind of the material.

A deep cooling (low-temperature treatment), i.e., a sub-zero treatment may be performed according to need. In the sub-zero treatment, a sample is submerged into a cold material at a low temperature such as liquid nitrogen or dry ice to cool the sample at a low temperature of 0° C. or less. This sub-zero treatment causes the martensitic transformation of the retained austenite in the stainless steel structure and prevents the aging (secular change) of the cutters.

However, because of the high hardness, the cutter blank 4 hardened by quenching has poor toughness and is brittle without further treatment. Unfortunately, such a cutter blank 4 often causes chipping and cracking of the blade. In order to prevent this problem, the cutter blank 4 is then tempered (tempering treatment). The conditions for tempering are different depending on the application of the cutter and the kind of the material. In general, carbon steels are tempered in a temperature range of about 160° C. to about 230° C., and stainless steels are tempered in a low temperature range of about 100° C. to about 150° C. to provide the predetermined toughness.

Subsequently, in order to remove an oxide film and a discolored part generated by heat treatments such as the quenching and the tempering, the surface of the cutter blank 4 is polished for finishing, thus preparing a blade body 5. In some cases, the cutter blank 4 is further polished to form a mirror finished surface. This process adjusts the color tone and the luster of the blade body to enhance the decorative and aesthetic properties. Furthermore, a grip 6 is attached to the blade body, and the blade edge is finally sharpened to complete a knife 7 as a cutter product (cutting tool).

Functional characteristics of the cutter required from the standpoint of users generally include items such as the cutting quality (sharpness), the superior blade durability (hardness, toughness), rusting resistance, the ease of sharpening, and decorative properties (luster, color tone). Characteristics of the cutter required from the standpoint of cutter manufacturers include, for example, machinability (the ease of cutting, the ease to produce a mirror finished surface, and the processable temperature range to produce a cutter by forging) and the ease of heat treatment (the temperature range of heat treatment, the critical quenching speed, the atmosphere during heat treatment, and less quenching distortion and quenching crack). In addition to the above required characteristics, knives for frozen foods and knives used in cold areas essentially require the cold resistance that prevents low-temperature embrittlement.

Accordingly, the workability to form a knife shape, the ease of heat treatment, and the ease of finish machining of the surface such as a mirror finished surface are important factors rather than the cost of steel blanks itself in order that knife manufacturers can decrease production cost. For the knife users, on the other hand, in addition to corrosion resistance, the cutting quality, and the ease of sharpening; decorative properties wherein a metallic luster has a high grade feeling are also an important factor. Furthermore, in knives used in very special purposes such as knives for frozen foods, cutters for food machines, and knives used in cold areas, toughness at low temperature is important. In knifes for meat, less attachment of the tallow is important. In a magnetic field environment, it is important that cutters are not magnetized. In surgical knives and the cutters for food machines, it is important that the cutting quality is not deteriorated by sterilization at high temperatures.

However, materials that can satisfy all the above characteristics required for the cutters are not in practical use. In reality, cutters are produced with materials that may sacrifice any of the above characteristics, and such cutters are unsatisfactorily obliged to use under the present situation. For example, when priority is given to the blade durability and the cutting quality, carbon tool steels are selected as the material. On the other hand, when priority is given to corrosion resistance, martensitic stainless steels are selected. Unfortunately, the former carbon tool steels readily rust and are significantly deteriorated with age. Therefore, at present, cutters composed of the latter martensitic stainless steels are the main stream on the market. However, in terms of the blade durability and the cutting quality, cutters composed of the latter martensitic stainless steels are somewhat inferior to those of the former carbon tool steels. In any case, all required characteristics are not satisfied.

As described above, for example, martensitic stainless steels having improved main characteristics such as the blade durability and the cutting quality are on the market as the material for cutters. However, these alloy materials generally have a bad machinability. In addition, these alloy materials require a strict and precise control of the heat treatment temperature to achieve the desired characteristics. As a result, these alloy materials require advanced techniques and a large amount of labor for operation management of the production equipment. Unfortunately, these problems significantly increase the production cost of the cutters such as knives.

Even though known cutters such as knives are composed of stainless steels, the stainless steels are martensitic alloys, which are significantly inferior to austenite alloys in terms of corrosion resistance. After the cutters are used; sweat, saline water, and blood are attached to the cutter. When maintenance cleanings are neglected, such attachments and leaving without further treatment drastically deteriorate the cutting quality within a short period of time and often generate rust. Unfortunately, the maintenance, the renewal, and the management of the known cutters are complex. In particular, for example, in 14Cr-4Mo stainless steels, which are now widely used as steels for high grade knives, the contact with saline water readily causes pitting corrosion. Therefore, the above stainless steels have a short durability (lifetime) and a problem in view of food sanitation.

Furthermore, since known cutters composed of iron-based alloys such as stainless steels are composed of a magnetic material, it is difficult or impossible to use such cutters under an environment including a magnetic field, for example, in a medical facility, e.g., an MRI. Therefore, although ceramics cutters are used for this purpose, such ceramic cutters have a poor cutting quality, compared with metallic cutters. Unfortunately, precise cutting operations are difficult to achieve.

Furthermore, a flange-shaped hilt is attached to, for example, outdoor knives for fear that users may carelessly touch the blade edge part. In order to attach the hilt to the knives, the blade body is heated to melt a brazing material, i.e., binder. Unfortunately, this process blunts the heated part and significantly decreases the hardness in the heated part and the peripheral part thereof. In particular, the abrasion of the blade edge drastically deteriorates the cutting quality. In addition, cutters that require sterilization, for example, cutters for food machines and surgical knives, are repeatedly sterilized by heating. However, such cutters and knives are obliged to be sterilized at a low temperature, or, in some cases, to be sterilized at a low temperature with medical agents for fear of blunting of the heated part and decreasing in the hardness. Unfortunately, the cutters and knives are insufficiently sterilized.

In order to solve the above problems and technical challenges, it is an object of the present invention to provide a cutter composed of a Ni—Cr alloy, in particular, produced with a superior workability and by a significantly simplified process, having a low deterioration in the hardness even when heated in use, having excellent corrosion resistance and low-temperature embrittlement resistance, and satisfactorily maintaining the cutting performance for a long time.

DISCLOSURE OF INVENTION

In order to achieve the above object, the present inventors experimentally produced knives using various alloy materials. The experiments were performed without limiting to the point of view to improve the composition of known metallic materials for cutters. In other words, the materials used in the experiments were not limited to the known iron-based alloy materials for cutters, in which carbides and the martensitic structure provide the hardness and toughness. The present inventors comprehensively compared and evaluated the effects of the alloy compositions on the characteristics of cutters in terms of not only general characteristics such as the cutting quality, the blade durability, corrosion resistance, and the workability; but also sensitive characteristics such as the color tone and the luster; cold resistance; and thermal deterioration resistance. As a result, the present inventors have found that, in particular, the use of Cr—Al—Ni-containing nickel-based alloys having specific compositions as the material for cutters effectively solves the above problems, and, for the first time, provides cutters such as knives that satisfy all characteristics required for the cutters. The present invention has been accomplished based on the above fact.

A cutter according to the present invention is composed of a Ni—Cr alloy containing from 32 to 44 mass percent (%) of Cr, from 2.3 to 6.0 mass percent of Al, the balance being Ni, impurities, and additional trace elements and having a Rockwell C hardness of 52 or more.

In the cutter, the Ni—Cr alloy is preferably nonmagnetic.

In the cutter, preferably, the chromium is partly replaced with at least one element selected from Zr, Hf, V, Ta, Mo, W and Nb, the total replacement ratio of Zr, Hf, V, and Nb is preferably one mass percent or less, the replacement ratio of Ta is preferably two mass percent or less, and the total replacement ratio of Mo and W is preferably 10 mass percent or less.

Furthermore, in the cutter, the total replacement ratio of a plurality of the elements represented by a formula $(Zr+Hf+V+Nb)\times10+Ta\times5+(Mo+W)$ is preferably 10 mass percent or less, wherein the name of elements Zr, Hf, Ta, Mo, W, and Nb represents the replacement ratio of each element, the elements partly replacing the chromium.

In the cutter, preferably, the aluminum is partly replaced with 1.2 mass % or less of Ti. Preferably, the nickel is partly replaced with 5 mass percent or less of Fe.

Furthermore, in the cutter, the Ni—Cr alloy preferably contains 0.1 mass percent or less of C, 0.05 mass percent or less of Mn, 0.005 mass percent or less of P, 0.005 mass percent or less of O, 0.003 mass percent or less of S, 0.02 mass percent or less of Cu, and 0.05 mass percent or less of Si as the impurities and the additional trace elements. In addition, the total content of P, O, and S is preferably 0.01 mass percent or less, and the total content of Mn, Cu, and Si is preferably 0.05 mass percent or less.

In the cutter, the Ni—Cr alloy preferably contains 0.025 mass percent or less of Mg, 0.02 mass percent or less of Ca, 0.03 mass percent or less of B, and 0.02 mass percent or less of rare earth elements including Y as the impurities and the additional trace elements. In addition, the total content of Mg, Ca, and B is preferably 0.03 mass percent or less (but when the total content of Mg, Ca, and B is 0.015 mass percent or more, the total content of P, O, and S is preferably 0.003 mass percent or less and the total content of Mn, Cu and Si is preferably 0.03 mass percent or less).

Furthermore, in the cutter, the Ni—Cr alloy is preferably composed of a texture wherein three phases including an a phase that is a Cr-rich phase, a γ phase that is a Ni-rich phase, and a γ' phase that is an intermetallic compound phase composed of $Ni_3Al$ as the basic composition are mixed.

In the cutter, the Ni—Cr alloy preferably has an average grain size of 1 mm or less.

In the Ni—Cr alloy forming a cutter of the present invention, chromium (Cr) is an essential component to provide the cutter with corrosion resistance and workability. The Cr content is at least 32 mass percent. The upper limit is 44 mass percent because an excessive Cr content impairs the stability of the austenite phase.

The Ni—Cr alloy forming a cutter of the present invention contains aluminum (Al) in the range of 2.3 to 6 mass percent. In addition to Cr and Ni, Al is useful to decompose the γ phase in the metallographic structure by aging treatment so that the γ phase grows from the grain boundary, and to form a mixed lamellar structure in which Cr-rich α phase, γ phase, and γ' phase ($Ni_3Al$ phase) are finely precipitated. Thus, the hardness of the cutter is improved. When the Al content is less than 2.3 mass percent, the hardness of the cutter is insufficiently improved. On the other hand, when the Al content exceeds 6 mass percent, the workability of the cutter material is deteriorated. Therefore, the Al content is controlled in the range of 2.3 to 6 mass percent, and preferably, 3 to 5 mass percent.

Nickel (Ni) is a base component to improve corrosion resistance and workability of the cutter material, and to provide the cutter material with structural strength. In addition, Ni is a component to improve the stability of the γ (gamma) phase, and is an effective component to provide superior hot workability (forgeability) and cold workability. However, because of high cost of Ni raw material, preferably, Ni is partly replaced with an inexpensive metallic material such as Fe in order to decrease the production cost of the cutter.

To provide superior characteristics of cutters in terms of not only general characteristics such as the cutting quality, the blade durability, corrosion resistance, and workability; but also sensitive characteristics such as the color tone and the luster; cold resistance; and thermal deterioration resistance, Rockwell C hardness of the Ni—Cr alloy forming the cutter is at least 52. When the Rockwell C hardness of the Ni—Cr alloy is lower than 52, the characteristics of blade durability, for example, the cutting quality of the cutter are deteriorated.

The Rockwell C hardness of the Ni—Cr alloy is measured by a method defined in the following International Standard or Japanese Industrial Standard (JIS). In other words, the Rockwell hardness is measured as follows based on DIN/DIS6508-1:1997 (JIS B 7726). In Rockwell C scale hardness test, an indenter shown in the following Table 1 moves down into a test sample having a flat and smooth surface, and the depth is measured to measure the hardness. An initial test load is applied and a zero reference position in depth is established. Furthermore, a test load is applied and the test load is then released leaving the initial test load applied again. The hardness is calculated by measuring the difference h (mm) between the two indent depths at the initial test load. The test is performed at ambient temperature of from 10° C. to 30° C. The holding time at the initial test load is 3 seconds or less. The initial test load is applied, and subsequently, the load is increased up to the full test load. The full test load is kept for 2 to 6 seconds, and the load is then released to the initial test load.

TABLE 1

| | Initial Test Load N | Scale | Indenter | Full Test Load N | Calculation Formula of Hardness |
|---|---|---|---|---|---|
| Rockwell Hardness | 98.07 | C | Diamond Indenter (Radius: 0.2 mm, Cone Angle: 120°) | 1471 | 100–500 h |

As described above, the cutters such as knives according to the present invention satisfy all characteristics required for the cutters, for example, not only general characteristics such as the cutting quality, the blade durability, corrosion resistance, and workability; but also sensitive characteristics such as the color tone and the luster; cold resistance; and thermal deterioration resistance.

Before the step of producing a plate on which a shape of a cutter such as a knife is formed, workability of the raw material is significantly affected by the kinds and the contents of elements other than the main components, the elements being added to improve characteristics, and impurities. In some cases, a problem such as cracking of a slab during hot working is generated. Such a problem increases cost of the blank.

Total content of impurities and additional trace elements is required to be set to 0.3% or less. This content range prevents the increase in the cost, and reduces defects due to inclusions generated during polishing of a cutter such as a knife. Impurities that should be particularly controlled include C, P, O, S, Cu, and Si. Manganese (Mn) is also contained as an impurity, and in addition, Mn is actively added for the purpose of achieving advantages. Herein, the impurities include inevitable impurities in the raw material and impurities that are contained during the production process.

Samples are experimentally produced and their hot workability is compared to investigate the effect of the kind and the content of the above impurities etc. (the term "impurities etc." refers to a generic term including impurities and additional trace elements). In the experiment, a 38% Cr-3.8% Al-balance Ni alloy is used as a base alloy. One of the elements selected from C, P, O, S, Cu, Si, and Mn is added to the base alloy. The content of the element is varied stepwise, and the content of the other impurities etc. is decreased on the order of ppm. The following contents can effectively decrease cracks generated during working. The preferable alloys include an alloy containing 0.1 mass percent or less of C as a single impurity, an alloy containing 0.05 mass percent or less of Mn as a single impurity, an alloy containing 0.005 mass percent or less of P as a single impurity, an alloy containing 0.005 mass percent or less of O as a single impurity, an alloy containing 0.003 mass percent or less of S as a single impurity, an alloy containing 0.02 mass percent or less of Cu as a single impurity, and an alloy containing 0.05 mass percent or less of Si as a single impurity. The addition of a trace of Si improves corrosion resistance and the hardness of the alloy. The content of Mn is preferably in the range of 0.005 to 0.02 mass percent. This preferable content of Mn improves the hot workability. In general, an alloy contains at least two such elements of the impurities etc., and some combinations of the elements cause a multiplier effect to impair the hot workability. In order to prevent this multiplier effect, preferably, the total content of P, O, and S is 0.005 mass percent or less, and in addition, the total content of Mn, Cu, and Si is 0.05 mass percent or less.

Most of the impurities etc. are derived from ingots, a crucible, and impurity components in the atmosphere during melting.

Furthermore, regarding Mg, Ca, B, and rare earth elements that are impurities and additional trace elements, if the content is small, the addition of the above elements improves the hot workability. These elements provide deoxidization and desulfurization effects and can be used as additives to improve the hot workability. These elements are preferably added as follows: Magnesium is added as a Ni—Mg alloy, calcium is added in a melting process using a crucible composed of calcia (CaO), boron is added as a Ni—B alloy, and rare earth elements are added as a rare earth metal or an alloy thereof such as a Misch metal.

Samples are experimentally produced and their hot workability is compared to investigate the effect of the kind and the content of the above impurities etc. In the experiment, a 38 mass percent Cr-3.8 mass percent Al-balance Ni alloy is used as a base alloy. One of the elements selected from Mg, Ca, B, and rare earth elements is added to the base alloy. The content of the element is varied stepwise, and the content of the other impurities etc. is decreased on the order of ppm. The following contents can effectively decrease cracks generated during hot working. The preferable alloys include an alloy containing 0.025 mass percent or less of Mg as a single impurity, an alloy containing 0.02 mass percent or less of Ca as a single impurity, an alloy containing 0.03 mass percent or less of B as a single impurity, and an alloy containing 0.02 mass percent or less of a rare earth element as a single impurity.

However, when at least two elements of the above impurities etc. are added at the same time, there are some cases where a multiplier effect is generated to impair the hot workability. Therefore, the total content of Mg, Ca, B, and rare earth elements is required to be controlled to 0.03 mass percent or less. Although the improvement of hot workability also depends on the oxygen content and sulfur (S) content, an addition of at least 0.005 mass percent of the above elements generally improves hot workability.

Chromium in the alloy may be partly replaced with at least one element selected from Zr, Hf, V, Nb, Ta, Mo, and W to increase the hardness of the cutter, thus improving the blade durability. However, the replacement by at least one element selected from Zr, Hf, V, and Nb deteriorates hot workability. In addition, an excessive replacement significantly decreases toughness and increases chipping of the blade. Therefore, the replacement ratio is preferably one mass percent or less. Herein, the replacement ratio represents the mass percent of replacing element or elements to the total components in the alloy.

When the replacing element is Ta, two mass percent or less of the replacement ratio can improve the blade durability with barely impairing the hot workability. When the replacing element is at least one of Mo and W, 10 mass percent or less of the replacement ratio can improve the hot workability, and in addition, improve the blade durability. In particular, when the replacing element is W, aging treatment can be preformed at 500° C., which is lower than that in the case of other elements. As long as the content of the above element or elements is within the above limit, after solution heat treatment, the alloy substantially has the same mechanical characteristics as those of an alloy in which the element or elements are not added. Therefore, the replacement by the above element or elements does not impair the workability.

Since the effects of the elements selected from Zr, Hf, V, Ta, Mo, W, and Nb on the workability and the characteristics of cutters are different between the elements, alloys having an equivalent content of the elements do not always have the predetermined characteristics. Accordingly, a total replacement ratio of a plurality of the above elements represented by a formula (Zr+Hf+V+Nb)×10+Ta×5+(Mo+W) is preferably 10 mass percent or less, wherein the name of elements Zr, Hf, Ta, Mo, W, and Nb represents a replacement ratio of each element, the elements partly replacing the chromium.

Aluminum in the alloy may be partly replaced with 1.2 mass percent or less of Ti. Although this replacement decreases hot workability, this replacement can adjust the hardness of the cutter after solution heat treatment. After aging treatment, the replaced alloy substantially has the same hardness as that of an alloy in which Al is not replaced. In order to readily produce a knife having a mirror finished surface, the alloy preferably has a certain degree of hardness. The replacement by Ti is particularly preferable when sensitive characteristics such as the color tone and the luster must be improved by mirror finish to enhance the design and high grade feeling of cutters. When the replacement ratio is a trace of 0.02 mass percent or less, the hot workability is improved. However, a replacement ratio exceeding 1.2 mass percent is not preferable because the hot workability is extremely deteriorated.

Furthermore, Ni in the alloy may be partly replaced with Fe to decrease the cost of raw material. When the replacement ratio is 5 mass percent or less, the product cost can be decreased without significantly deteriorating the cutter characteristics. However, when the replacement ratio exceeds 5 mass percent, a decomposition reaction to form the mixed lamellar structure in which Cr-based α phase, γ phase, and γ' phase ($Ni_3$ Al phase) are finely precipitated is difficult to achieve. As a result, the excessive replacement ratio does not provide desired characteristics such as the hardness.

Controlling the components and metallographic structure is important because the composition significantly affects the ease to produce steel blanks for knives and the characteristics such as blade durability and toughness.

Steels used as the material of cutters such as knives according to the present invention are produced as follows: An ingot is produced by melting and the ingot is then processed by hot working and cold working to form a plate having a desired thickness. Subsequently, solution heat treatment is performed at a temperature of 1,000° C. to 1,300° C. in argon atmosphere, nitrogen atmosphere, or in air. The plate is then quenched at a cooling rate higher than oil quenching to form a blank used to produce the knives. Most part of the structure of this blank is a single homogeneous Ni-based γ phase. The blank has a Vickers hardness (Hv) of 300 or less, which provides the best machinability.

Subsequently, the blank processed as described above is machined at a manufacturing plant of cutters to produce near net shaped products. Aging treatment is then performed by heating the products at 550° C. to 800° C. When an alloy produced by partly replacing Cr with W is used, the aging treatment is preferably performed in a temperature range of 500° C. to 850° C. This aging treatment is performed in argon atmosphere, nitrogen atmosphere, or in air.

In aging treatment (age-hardening treatment), a cutter having a mirror finished surface is preferably subjected to bright treatment (bright annealing) in a hydrogen atmosphere furnace. Since this treatment barely generates a discolored layer on the surface of the cutter material, final polishing is readily performed. In aging treatment, the γ phase in the metallographic structure is decomposed so that the γ phase grows from the grain boundary, and a mixed lamellar structure is formed in which Cr-based α phase, γ phase, and γ' phase ($Ni_3Al$ phase) are finely precipitated. Thus, the hardness of the metallographic structure is increased by aging treatment. Aging treatment performed at 550° C. or less does not provide a sufficient hardness because a large amount of untransformed α phase remains. Aging treatment at about 650° C. provides the highest hardness. However, since cutters also require toughness, according to need, aging treatment may be performed at 700° C. or more, which causes overaging, or at 600° C. or less, which provides a small amount of untransformed α phase. In terms of controlling the structure, the overaging treatment is easier.

As described above, the blank for the cutter is subjected to solution heat treatment at a temperature of 1,000° C. to 1,300° C. and is then quenched from this temperature. Subsequently, the blank is machined and is then subjected to aging treatment at a temperature of 500° C. to 850° C. This process provides a cutter having a superior machinability and a high durability of cutting quality (blade durability).

When the aging treatment is performed at a temperature of 500° C. to 850° C. and then the cutter has a Rockwell hardness C of 52 or more, the cutter has superior blade durability.

Furthermore, when the aging treatment is performed at a temperature of 550° C. to 800° C. and then the cutter has a Rockwell hardness C of 55 or more, the blade durability of the cutter can be further improved.

The blank for the cutter is quenched from a temperature of 1,000° C. to 1,300° C. After this treatment, when the blank has a Vickers hardness of 300 or less, this blank has the best machinability. The blank is machined and aging treatment is then performed. Thus, the production process of the cutters is drastically simplified.

The Ni—Cr alloy material used in the present invention shows superplasticity when the grain size is finely controlled so that the average grain size is 1 mm or less. The superplasticity enables a near net shaping in which a single step of hot working provides a near net shaped cutter such as a knife. In general alloy materials, since repeated workings harden the materials, further working is difficult to achieve. In contrast, according to the Ni—Cr alloy material used in the present invention, work hardening barely occurs under the following limited conditions. Therefore, superplastic forming can be performed in which a cutter having its final shape is produced from a raw material plate by a successive working.

Furthermore, the above production process does not require annealing operation during working. Thus, the production process of cutters is significantly simplified, and in addition, the production cost of the cutters can be drastically decreased. Recommended conditions for forming operation are as follows: The Ni—Cr alloy blank has an average grain size of 1 mm or less. In the forming process, the temperature is 1,000° C. to 1,300° C., and the strain rate is in the range of $10^{-4}$/second to $10^{-2}$/second.

The cutter according to the present invention is composed of a Ni—Cr alloy containing predetermined amounts of Cr and Al and having a Rockwell C hardness of 52 or more. As a result, the alloy particularly has a superior workability, and the production process of the cutter can be significantly simplified. Furthermore, the present invention provides an inexpensive cutter having a low deterioration in the hardness even when heated in use, having excellent corrosion resistance and low-temperature embrittlement resistance, and satisfactorily maintaining the cutting performance for a long time.

REFERENCE NUMERALS

1: plate, 2: grip-fixing hole, 3: formed body, 4: cutter blank, 5: blade body, 6: grip, 7: knife (cutter).

BEST MODE FOR CARRYING OUT THE INVENTION

Embodiments of the present invention will now be specifically described with reference to the attached drawings, the following Examples, and Comparative Examples. The present invention is not limited to the following embodiments, and can be appropriately modified.

Example 1

Figure 1:
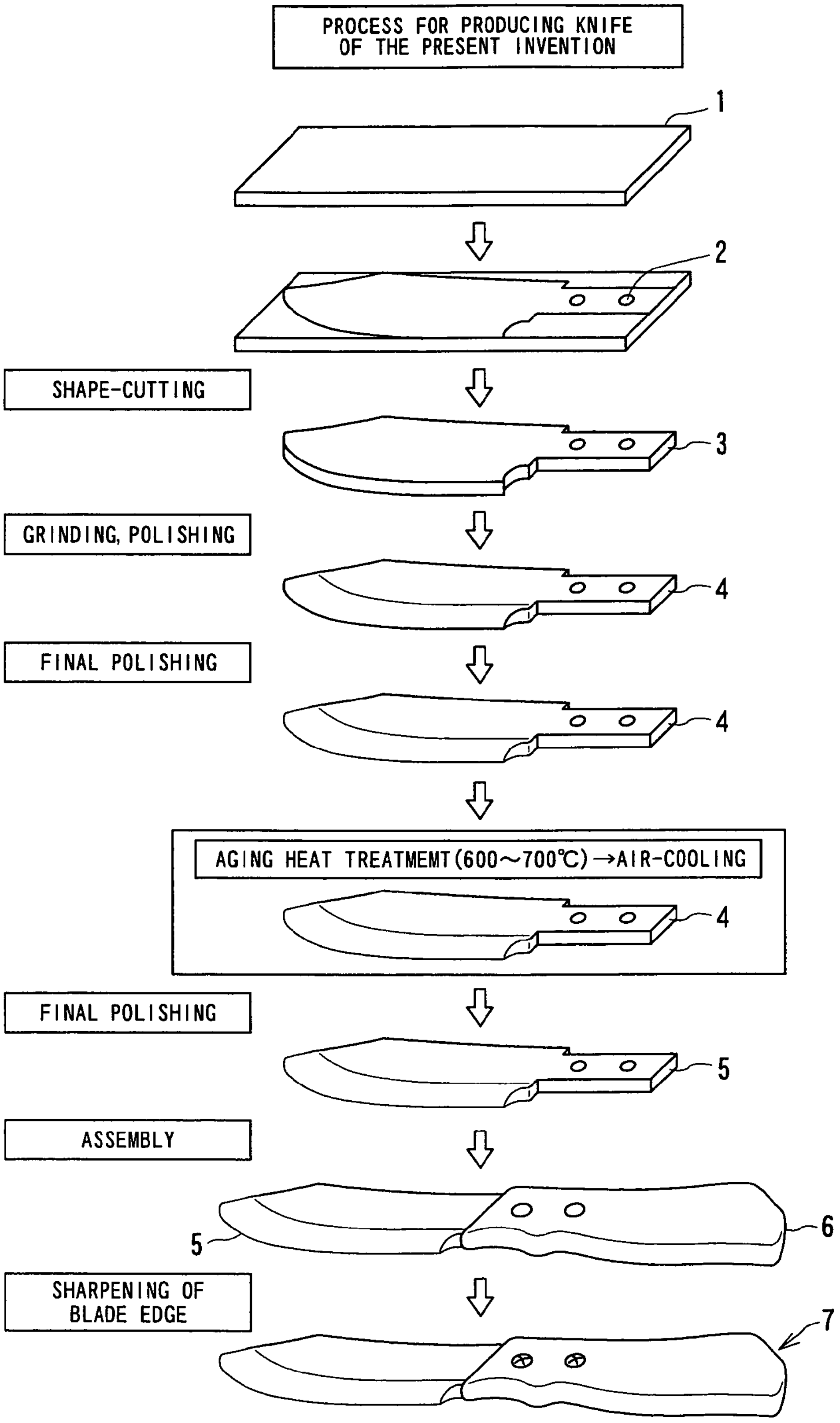
FIG. 1 includes perspective views showing a process for producing a knife, which is an example of a cutter according to the present invention.

A Ni—Cr alloy having a composition of 38% Cr-3.8% Al-balance Ni was melted and cast by a vacuum melting process. Subsequently, the resultant alloy was forged and rolled to prepare a blank plate 1 shown in FIG. 1 having a dimension of 300 mm in width×2,000 mm in length×4.4 mm in thickness. This blank plate 1 was subjected to solution heat treatment at 1,200° C. in a vacuum heat treatment furnace adjusted in argon atmosphere and was then submerged into oil to quench. Subsequently, the surface of the blank plate 1 was ground by 0.2 mm to remove an alteration layer generated by quenching.

The resultant blank plate 1 (300 mm in width×2,000 mm in length×4 mm in thickness) was cut with a laser cutter to prepare a formed body 3 having a knife shape. In the formed body 3, the dimension of the blade part was 160 mm×40 mm, and the dimension of the grip part was 80 mm×20 mm. Grip-fixing holes 2 were formed with a drilling machine at the grip part of the formed body 3. Furthermore, the blade edge part of the formed body 3 was ground with a belt grinder to form a wedge-shaped cross-section, thereby preparing a cutter blank 4. In the cutter blank 4, the leading edge of the blade part had a thickness of 0.5 mm. The surface of the cutter blank 4 was then polished with the belt grinder and a polisher to form a mirror finished surface. Subsequently, the cutter blank 4 was charged in a vacuum furnace. The pressure in the vacuum furnace was reduced to degas the atmosphere. The cutter blank 4 was subjected to aging heat treatment at 700° C. for two hours in argon atmosphere, cooled to about 150° C. for one hour in Ar gas, and then discharged from the vacuum furnace.

After the aging heat treatment, the surface of the cutter blank 4 was tarnished to some degree, but a mirror finished surface was readily formed by final polishing with the polisher. Thus, a blade body 5 having a high aesthetic property was produced.

Figure 2A:
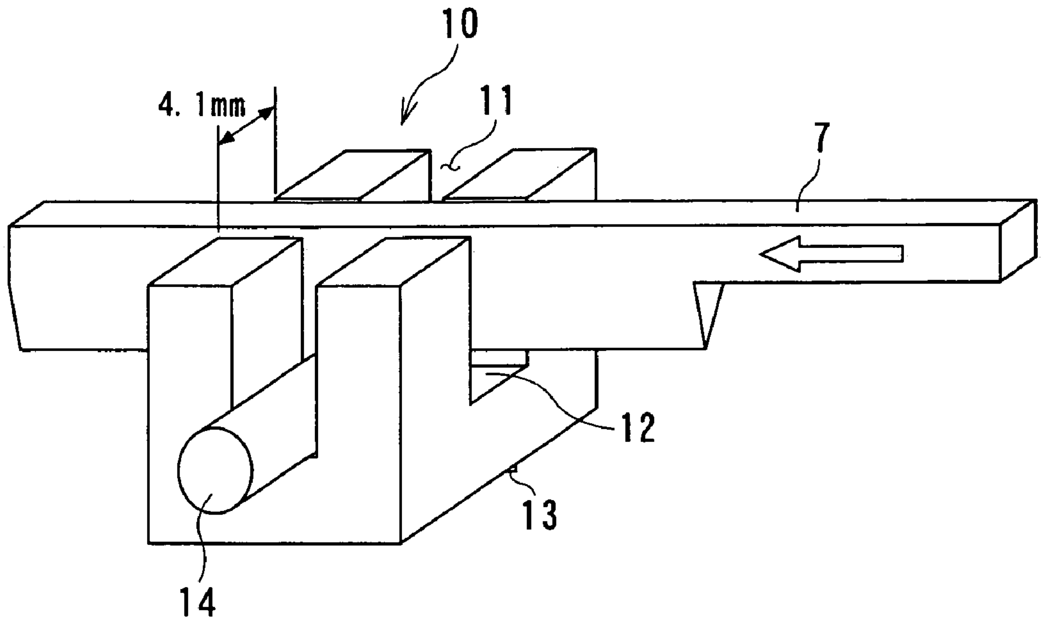
In FIG. 2, (A) is a perspective view showing a structure of a rope cut tester, and (B) is a cross-sectional view showing a situation during cutting in the rope cut tester.
Figure 2B:
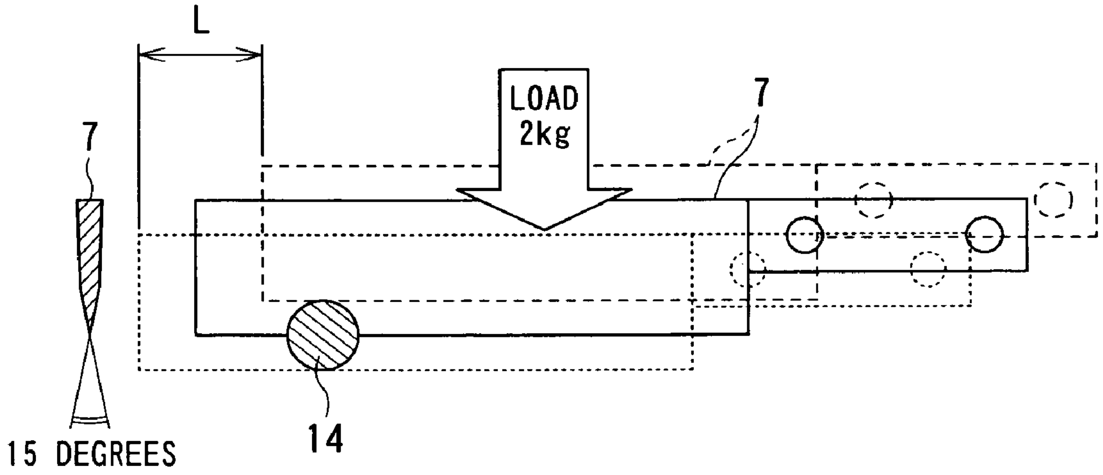

A grip 6 was attached to the blade body 5. Subsequently, as shown in FIG. 2(B), the blade part was sharpened with an angle of 15 degrees with an oil stone to prepare a knife 7, which was a cutter according to the Example 1. The hardness at a flat area of the knife 7 was measured with a Rockwell hardness tester. The knife 7 had a Rockwell C hardness ($H_{RC}$) of 59.

In this state, the contents of impurities in the knife 7 were measured with an X-ray microanalyzer (EPMA). The Si content was 0.01 mass percent, the Mg content was 0.013 mass percent, the Mn content was 0.01 mass percent, the Ca content was 0.005 mass percent, the C content was 0.03 mass percent, and the O content was 0.002 mass percent.

In order to evaluate the blade durability (the durability of cutting quality) of the knife 7 prepared as described above, which was a cutter according to the Example 1, a rope cut tester 10 was prepared. The rope cut tester 10 includes a fixing jig 13 having recesses 11 and 12 formed in a cross direction, an object 14 to be cut, the object 14 being inserted in the recess 11 to be fixed, and a knife, which is a cutter 7. The knife 7 is inserted in the recess 12 orthogonal to the recess 11 and having a width of 4.1 mm. The knife 7 reciprocates in the horizontal direction while the blade edge is pressed on the object 14 to be cut.

Figure 3:
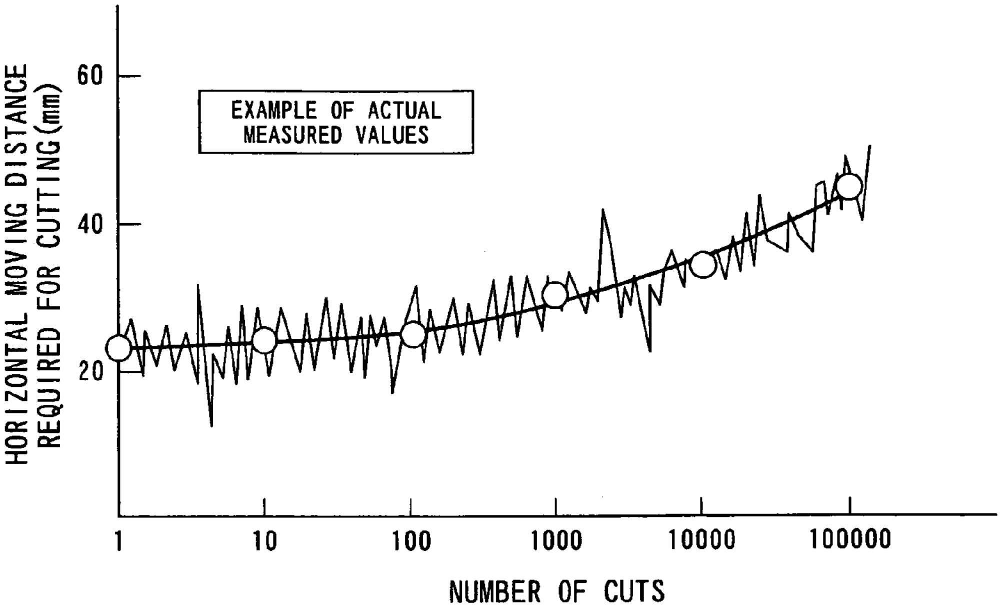
FIG. 3 is a graph showing a relationship between the number of cuts and an example of measured values of a horizontal moving distance of a cutter required for cutting a rope in a rope cut test.

A cut test was performed with the above rope cut tester 10. The linear blade part of the knife was pressed on a hemp rope having a diameter of 10 mm, which was the object 14 to be cut. In order to fix the hemp rope 14, a part of the hemp rope 14 to be cut was nipped to be fixed to the fixing jig 13 with a width of 4.1 mm. The knife 7 was inserted in the fixing jig 13 to perform the cut test. During cutting, as shown in FIG. 2(B), the knife 7 reciprocated in the horizontal direction while a load of 2 kg was applied to the knife 7. A horizontal moving distance L of the knife 7 required for completely cutting the hemp rope 14 was repeatedly measured. FIG. 3 shows the measurement result.

As clearly shown in the result in FIG. 3, the measured values of the moving distance L of the knife 7 required for cutting the rope considerably fluctuated depending on the cut operation (the number of cuts). Therefore, the central value in the dispersion was represented as the horizontal moving distance L required for cutting. As described above, the cutter according to Example 1 was composed of Cr—Ni alloy adjusted in the predetermined composition and Rockwell C hardness. Referring to the result shown in FIG. 3, in this cutter according to Example 1, even after 100,000 times of the cut operation, the moving distance L of the cutter required for cutting the rope was approximately doubled compared with the initial state. This result showed that the cutter of Example 1 could maintain the superior cutting quality for a long time.

Comparative Example 1

Figure 8:
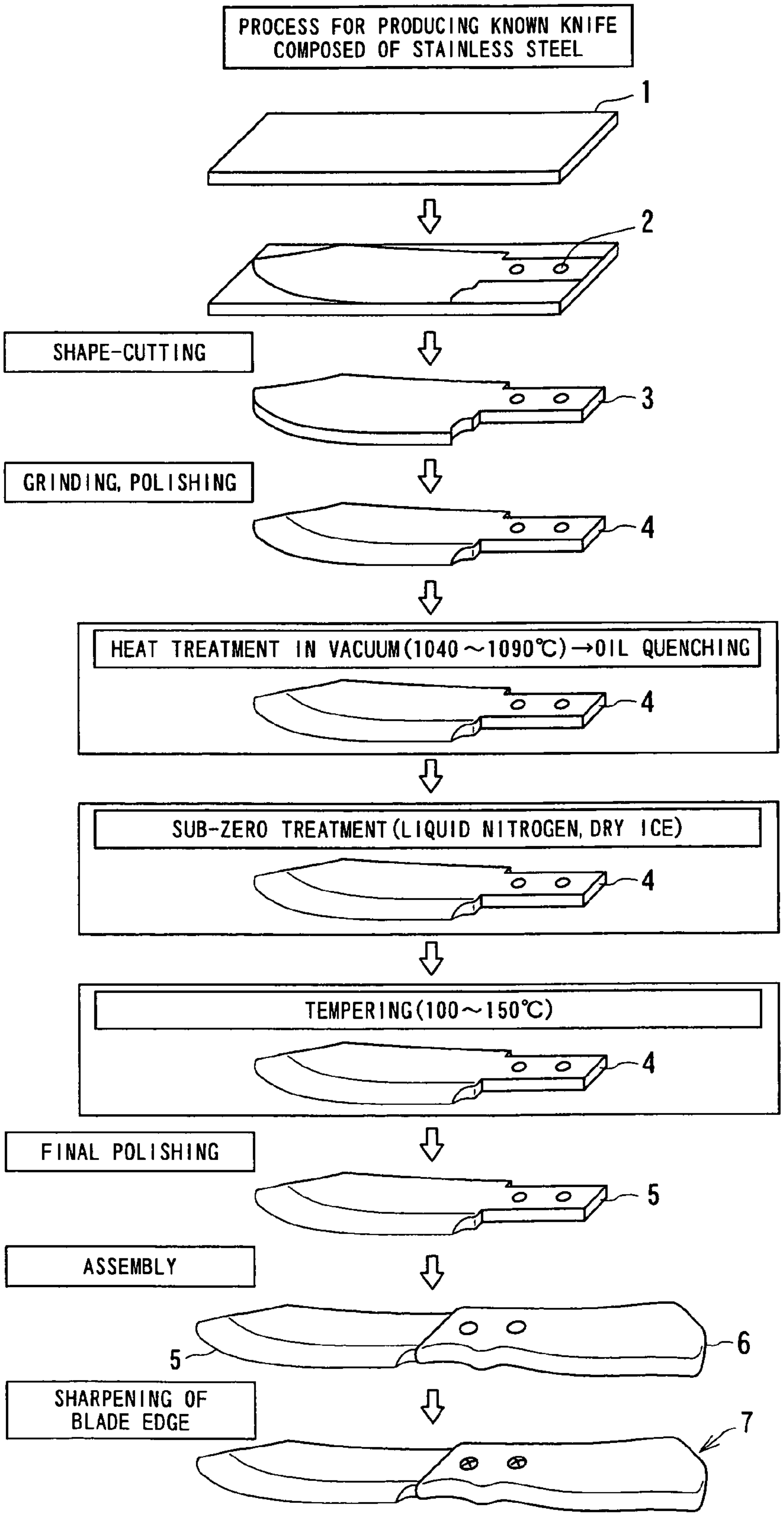
FIG. 8 includes perspective views showing a process for producing a known knife composed of a general stainless steel.

A knife according to Comparative Example 1, which was a known cutter, was prepared using a commercially available 14Cr-4Mo stainless steel. The knife was processed so as to have the same shape as that of the knife in Example 1. As shown in the production process in FIG. 8, the 14Cr-4Mo stainless steel alloy was forged and rolled to prepare a blank plate 1 shown in FIG. 8. This blank plate 1 was cut with a laser cutter to prepare a formed body 3 having the knife shape. In the formed body 3, the dimension of the blade part was 160 mm×40 mm, and the dimension of the grip part was 80 mm×20 mm. Grip-fixing holes 2 were formed with a drilling machine at the grip part of the formed body 3. Furthermore, the blade edge part of the formed body 3 was ground with a belt grinder to form a wedge-shaped cross-section, thereby preparing a cutter blank 4. In the cutter blank 4, the leading edge of the blade part had a thickness of 0.5 mm. The surface of the cutter blank 4 was then polished with the belt grinder and the polisher to form a mirror finished surface.

Subsequently, the cutter blank 4 was charged in a vacuum furnace. The pressure in the vacuum furnace was reduced to degas the atmosphere. The temperature was increased up to 1,050° C. for quenching, which was a condition for heat treatment in a general cutter-manufacturing industry, and the cutter blank 4 was then subjected to oil quenching. Subsequently, the cutter blank 4 was submerged into liquid nitrogen to perform sub-zero treatment. Furthermore, the cutter blank 4 was subjected to tempering at 150° C. and was then air-cooled. The surface of the cutter blank 4 was polished with a polisher to remove the tarnish generated by the above heat treatment and to form a mirror finished surface. A grip was attached, and the blade part was then sharpened with an angle of 15 degrees with an oil stone to produce a knife, which was a known cutter according to the Comparative Example 1. The equipment such as the grinding belt and the grindstone used in this process was the same as that in Example 1.

Figure 4:
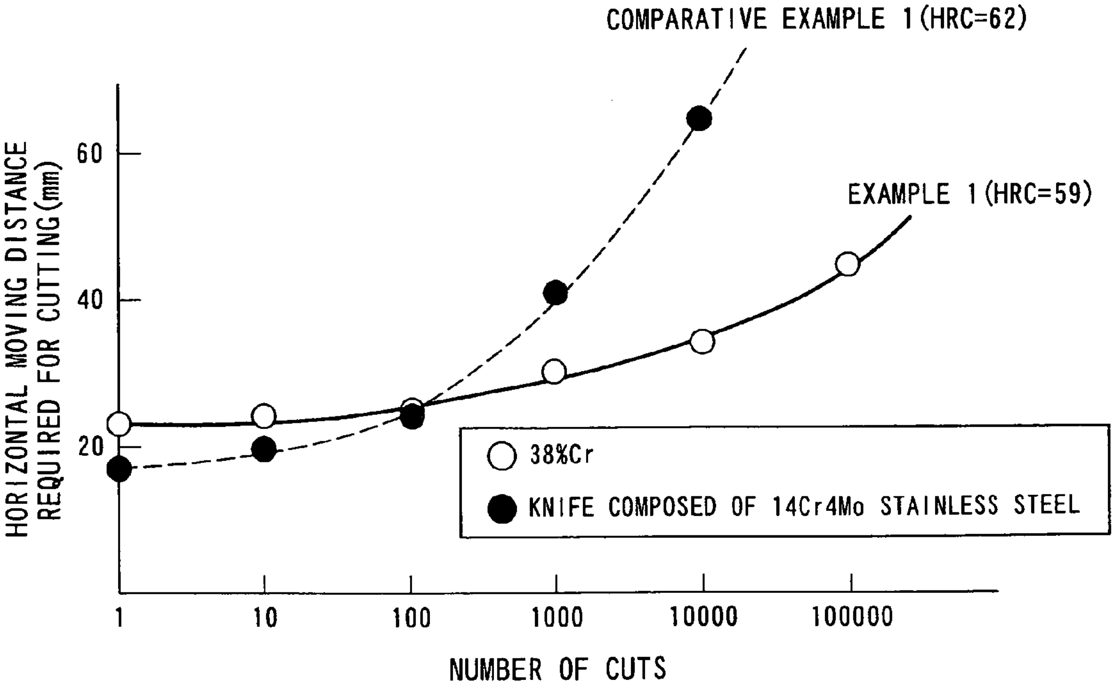
FIG. 4 is a graph showing a relationship between the number of cuts and measured values of a horizontal moving distance of a cutter required for cutting a rope in rope cut tests using cutters according to Example 1 and Comparative Example 1.

The hardness at a flat area of the knife according to Comparative Example 1 was measured. The knife had a Rockwell C hardness ($H_{RC}$) of 62. In order to evaluate the blade durability (the durability of cutting quality) of the prepared knife 7 according to Comparative Example 1, a cut test was performed as in Example 1 with the rope cut tester 10 shown in FIGS. 2(A) and 2(B). The linear blade part of the knife was pressed on a hemp rope having a diameter of 10 mm, which was the object 14 to be cut. During cutting, the knife reciprocated in the horizontal direction while a load of 2 kg was applied. A horizontal moving distance L of the knife required for completely cutting the hemp rope, which was the object to be cut, was repeatedly measured. FIG. 4 shows the measurement result of Comparative Example 1 with the result of Example 1.

The knife of Comparative Example 1 had a Rockwell C hardness ($H_{RC}$) of 62, which was a little higher than that of the cutter in Example 1, but had a completely different alloy composition from that of Example 1. Therefore, as clearly shown in the results in FIG. 4, as the number of cuts increased, the horizontal moving distance L of the knife of Comparative Example 1 required for cutting the rope was drastically increased. This result indicated that the cutting quality of the cutter was drastically deteriorated.

In contrast, the cutter according to Example 1 was composed of Cr—Ni alloy adjusted in the predetermined composition and Rockwell C hardness. In this cutter of Example 1, even after 100,000 times of the cut operation, the moving distance L of the cutter required for cutting the rope was approximately doubled compared with the initial state. This result showed that the cutter of Example 1 had a low deterioration of the cutting quality and could maintain the superior cutting quality for a long time.

The workability of the blank was evaluated in Example 1 and Comparative Example 1. The production process of the knife of Comparative Example 1 composed of the 14Cr-4Mo stainless steel was more complex than that of Example 1 composed of the Cr—Ni alloy. In comparative Example 1, the polishing process time to form the wedge-shaped cross-section with the belt grinder was 2.5 times as long as that in Example 1. Furthermore, in comparative Example 1, the polishing process time to form a mirror finished surface before heat treatment was three times as long as that in Example 1, and the workability to form the mirror finished surface was also inferior to that in Example 1. However, the time required for sharpening the blade part was almost the same between Example 1 and Comparative Example 1, that is, there was not a significant difference. In Comparative Example 1, the additional polishing process time to form a mirror finished surface after heat treatment was two times as long as that in Example 1.

Examples 2 and 3 and Comparative Examples 2 and 3

Alloys having a composition of 31% to 45% Cr-3.8% Al-balance Ni were melted and cast by a vacuum melting process. Forging, rolling, solution heat treatment, quenching, grinding, and aging heat treatment were performed as in Example 1 to prepare blanks for the cutters. Furthermore, the grip was combined as in Example 1 to produce knives according to Examples and Comparative Examples.

After aging treatment, the surface hardness of the knives according to the Examples and the Comparative Examples depended on the Cr content. An alloy containing 31% of Cr (Comparative Example 2) had a hardness of $H_{RC}$ 39, an alloy containing 33% of Cr (Example 2) had a hardness of $H_{RC}$53, an alloy containing 38% of Cr (Example 1) had a hardness of $H_{RC}$63, an alloy containing 43% of Cr (Example 3) had a hardness of $H_{RC}$ 55, and an alloy containing 45% of Cr (Comparative Example 3) had a hardness of $H_{RC}$43.

In order to evaluate the blade durability (the durability of cutting quality) of the knives according to the Examples and the Comparative Examples, a cut test of a hemp rope was performed as in Example 1 with the rope cut tester 10 shown in FIG. 2. A moving distance L of the knife required for cutting the hemp rope was measured. Results shown in FIG. 5 were obtained in addition to the result of Example 1.

Figure 5:
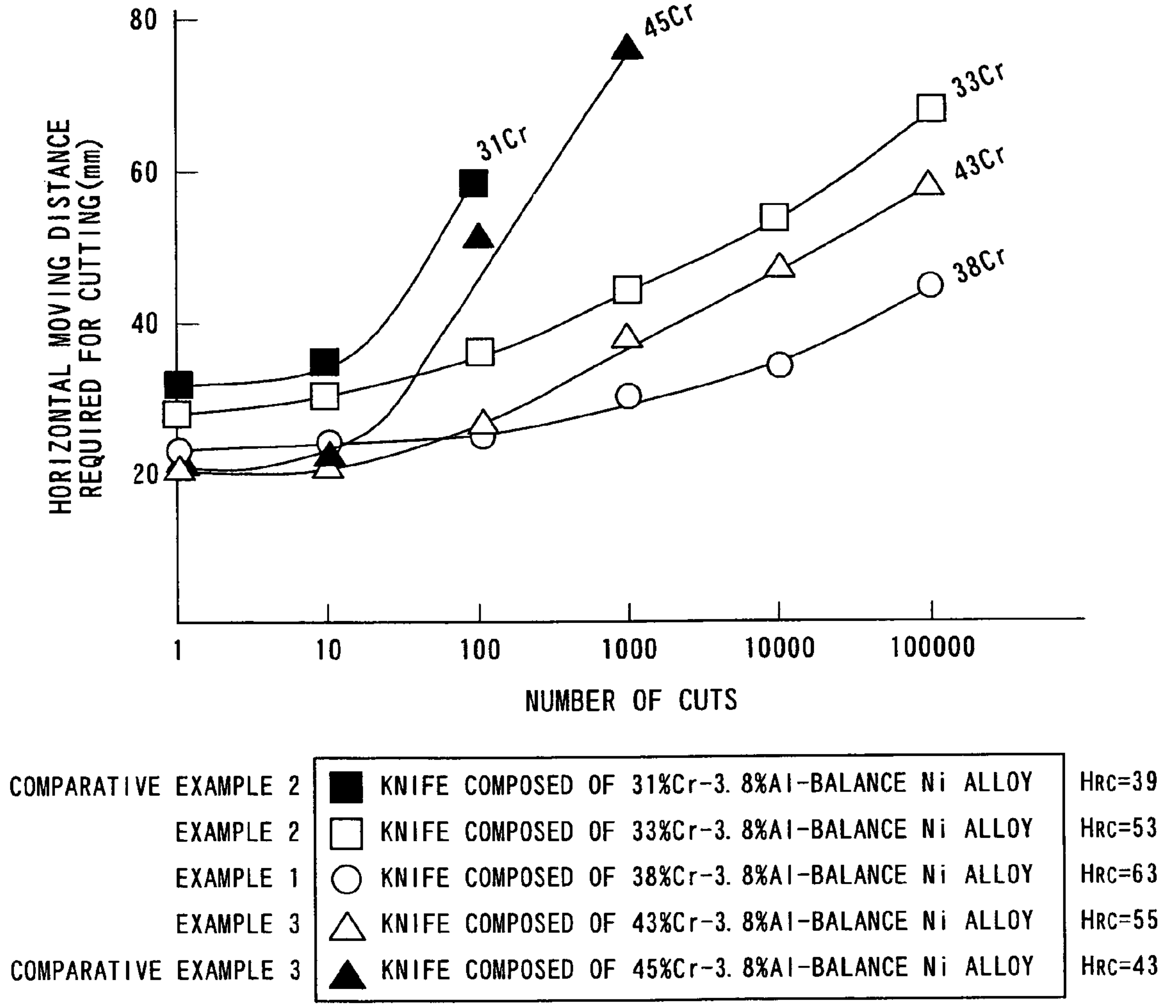
FIG. 5 is a graph showing a relationship between the number of cuts and measured values of a horizontal moving distance of a cutter required for cutting a rope in rope cut tests using cutters according to Examples 2 and 3 and Comparative Examples 2 and 3.

As shown in the graph shown in FIG. 5, when the Cr content of the knife was about 38 mass percent, the knife had the best blade durability. On the other hand, when the Cr content of the knife was less than 32% or exceeded 44%, the blade durability was deteriorated. This tendency can also be supposed in view of the hardness values. In order to produce a knife having superior blade durability, it was clear that at least the Rockwell hardness ($H_{RC}$) of the knife must be 52 or more.

Examples 4 to 6 and Comparative Examples 4 and 5

The characteristics of cutters will now be described with reference to the following Examples and Comparative Examples in which the Al content in alloys forming the cutters is varied. Alloys having a composition of 38% Cr-2.1% to 6.3% Al-balance Ni were separately melted and cast by a vacuum melting process. Forging, rolling, solution heat treatment, quenching, grinding, and aging heat treatment were performed as in Example 1 using the prepared alloy ingots to prepare blanks for the cutters. Furthermore, the grip was combined as in Example 1 to produce knives according to Examples and Comparative Examples.

After aging treatment, the surface hardness of the knives according to the Examples and the Comparative Examples depended on the Al content. An alloy containing 2.2% of Al (Comparative Example 4) had a hardness of $H_{RC}$48, an alloy containing 2.4% of Al had a hardness of $H_{RC}$55, an alloy containing 3.8% of Al (Example 1) had a hardness of $H_{RC}$63, an alloy containing 5.3% of Al had a hardness of $H_{RC}$60, and an alloy containing 6.3% of Al (Comparative Example 5) had a hardness of $H_{RC}$49.

In order to evaluate the blade durability of the knives according to the Examples and the Comparative Examples, a cut test of a hemp rope was performed as in Example 1. A moving distance L of the knife required for cutting the hemp rope was measured. Results shown in FIG. 6 were obtained in addition to the result of Example 1.

Figure 6:
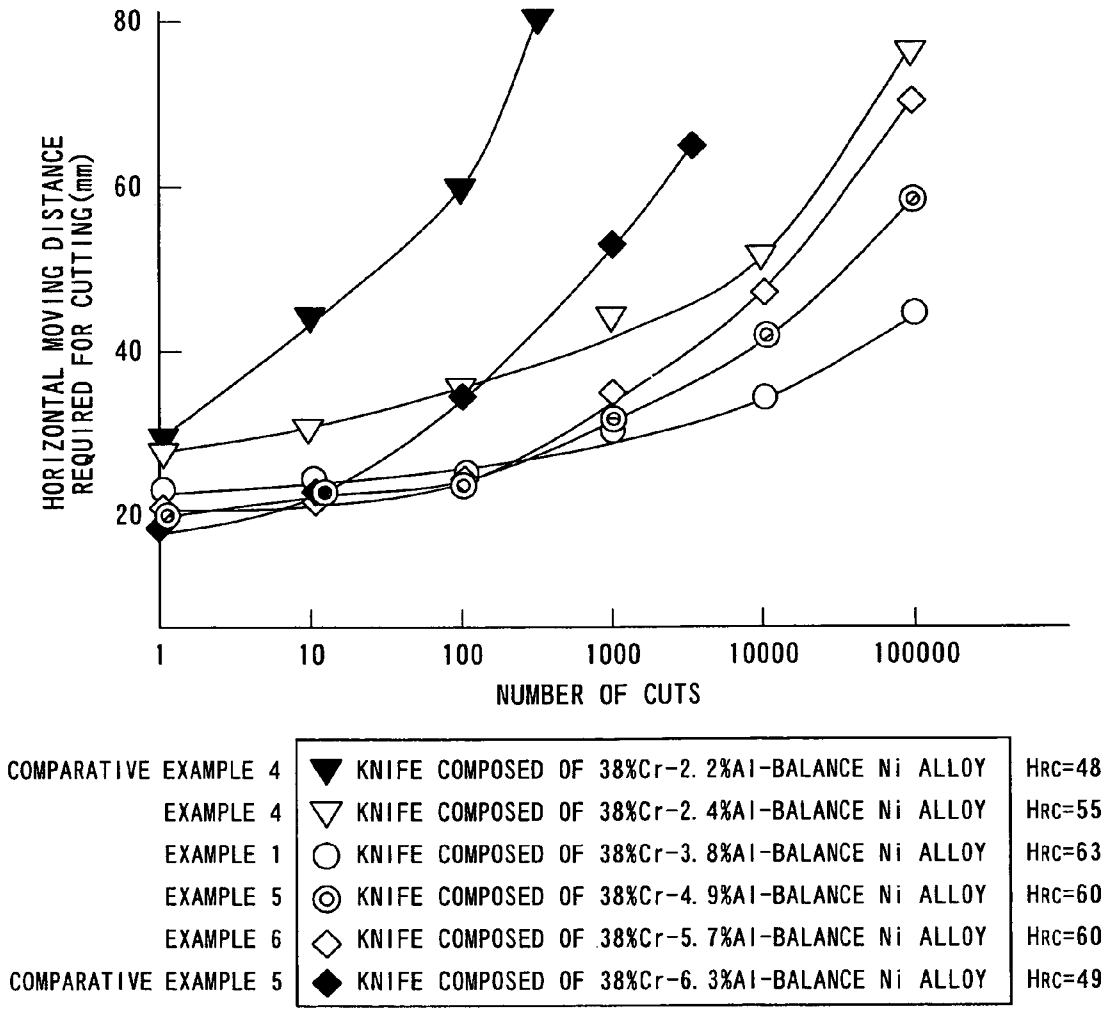
FIG. 6 is a graph showing a relationship between the number of cuts and measured values of a horizontal moving distance of a cutter required for cutting a rope in rope cut tests using cutters according to Examples 4 to 6 and Comparative Examples 4 and 5.

As shown in the graph shown in FIG. 6, when the Al content of the knife was about 3.8 mass percent, the knife had the best blade durability. On the other hand, when the Al content of the knife was less than 2.2% or exceeded 6.0%, the blade durability was deteriorated. When the Al content exceeded 6.0%, the hardness of the cutter was at least $H_{RC}$52 and a certain level of the blade durability was achieved in the rope cut test. In this case, however, the blade was chipped and the cutting quality was readily deteriorated. When the Al content exceeded 5.0%, the blank for the cutter readily caused cracking during hot working. In view of these facts, the Al content in the steel for the knives is preferably from 2.3 to 6.0 mass percent, and more preferably, from 2.8 to 4.8 mass percent.

Example 7

As shown in Tables 1 and 2, the following various alloys were produced using a base alloy composition of 38 mass percent Cr-3.8% Al-balance Ni. Chromium in the alloy was partly replaced with at least one element selected from Zr, Hf, V, Nb, Ta, Mo, and W. Aluminum in the alloy was partly replaced with Ti. The contents of impurities and additional trace elements were varied. For example, each content of C, Mn, P, O, S, Cu, and Si, the total content of P, O, and S, the total content of Mn, Cu, and Si, each content of Mg, Ca, B, and rare earth elements (RE), and the total content of Mg, Ca, B, and rare earth elements (RE) were varied to prepare the various alloys.

Subsequently, forging, rolling, solution heat treatment, quenching, grinding, and aging heat treatment were performed as in Example 1 using the above alloys to prepare blanks for the cutters. Furthermore, the grip was combined as in Example 1 to produce knives according to Example 7.

In the knives according to Example 7, the Vickers hardness (Hv 0.5; test load 4.903 N) was measured after solution heat treatment, and the surface hardness ($H_{RC}$: Rockwell hardness) was measured after aging treatment with corresponding hardness testers. The hot workability was also evaluated. In order to evaluate the hot workability, a production yield was calculated as follows: Defective material that caused cracking and fracture during working was subtracted from the input material. The percent by weight of the produced blank to the input material was represented as the production yield. An evaluation symbol ⊙ represents that the production yield was 70% or more, an evaluation symbol ○ represents that the yield was from 69% to 50%, an evaluation symbol Δ represents that the yield was from 49% to 40%, and an evaluation symbol x represents that the yield was 39% or less.

In order to evaluate the blade durability (the durability of cutting quality) of the knives according to Example 7, a cut test of a hemp rope was performed as in Example 1. At the time of the thousandth cut test, a horizontal moving distance L of the knife required for cutting the hemp rope was measured. The following Table 2 and Table 3 show the measurement results in this cut test and the evaluation results of the above hot workability.

TABLE 2

| | Cutter Material Composition (Mass %) | | | | | | | | | | | Hardness After Solusion Treatment | Hot | Hardness After Aging Treatment | Horizontal Moving Distance at the Thousandth Cut Test |
|---|---|---|---|---|---|---|---|---|---|---|---|---|---|---|---|
| Sample No. | Cr | Al | Ti | Zr | Hf | V | Nb | Ta | Mo | W | Ni | (Hv 0.5) | Workability | ($H_{RC}$) | (mm) |
| 1 | 38.1 | 3.81 | — | — | — | — | — | — | — | — | Balance | 160 | ◎ | 59 | 29 |
| 2 | 36.8 | 3.79 | — | 0.96 | — | — | — | — | — | — | Balance | 178 | ○ | 61 | 27 |
| 3 | 37.1 | 3.82 | — | 1.10 | — | — | — | — | — | — | Balance | 182 | X | 62 | 35 |
| 4 | 37.0 | 3.80 | — | — | 0.98 | — | — | — | — | — | Balance | 168 | ○ | 61 | 27 |
| 5 | 37.0 | 3.80 | — | — | 1.08 | — | — | — | — | — | Balance | 170 | X | 62 | 32 |
| 6 | 37.1 | 3.82 | — | — | — | 0.94 | — | — | — | — | Balance | 173 | ○ | 60 | 28 |
| 7 | 36.8 | 3.83 | — | — | — | 1.14 | — | — | — | — | Balance | 179 | X | 61 | 35 |
| 8 | 37.0 | 3.79 | — | — | — | — | 0.99 | — | — | — | Balance | 176 | ○ | 60 | 23 |
| 9 | 36.9 | 3.82 | — | — | — | — | 1.05 | — | — | — | Balance | 180 | X | 61 | 23 |
| 10 | 35.9 | 3.75 | — | — | — | — | — | 1.99 | — | — | Balance | 176 | ○ | 64 | 21 |
| 11 | 36.0 | 3.79 | — | — | — | — | — | 2.20 | — | — | Balance | 180 | Δ | 65 | 23 |
| 12 | 28.1 | 3.80 | — | — | — | — | — | — | 9.80 | — | Balance | 198 | ○ | 62 | 25 |
| 13 | 28.0 | 3.82 | — | — | — | — | — | — | 11.50 | — | Balance | 204 | Δ | 62 | 39 |
| 14 | 28.6 | 3.83 | — | — | — | — | — | — | — | 9.70 | Balance | 182 | ◎ | 64 | 24 |
| 15 | 28.2 | 3.80 | — | — | — | — | — | — | — | 12.20 | Balance | 190 | Δ | 64 | 32 |
| 16 | 36.7 | 3.81 | — | 0.30 | — | — | — | — | — | 8.20 | Balance | 189 | ○ | 64 | 25 |
| 17 | 37.0 | 3.78 | — | — | — | — | 0.30 | 1.40 | — | — | Balance | 190 | ○ | 63 | 26 |
| 18 | 31.6 | 3.83 | — | — | 0.20 | — | — | — | 6.20 | — | Balance | 199 | ○ | 62 | 25 |
| 19 | 37.2 | 3.50 | 0.30 | — | — | — | 0.50 | — | — | 2.30 | Balance | 246 | ○ | 61 | 26 |
| 20 | 37.9 | 2.70 | 1.10 | — | — | — | — | — | — | — | Balance | 285 | ○ | 59 | 28 |
| 21 | 38.1 | 2.71 | 1.30 | — | — | — | — | — | — | — | Balance | 402 | X | 56 | 32 |

TABLE 3

| Sample No. | Cutter Material Composition (Mass %) Cr | Al | P | O | S | P + O + S | Mn | Cu | Si | Mn + Cu + Si | Mg | Ca | B | RE | Mg + Ca + B + RE | Fe | Ni | Hot Workablity |
|---|---|---|---|---|---|---|---|---|---|---|---|---|---|---|---|---|---|---|
| 22 | 38.3 | 3.82 | 0.0041 | 0.0012 | 0.0005 | 0.0058 | 0.007 | 0.002 | 0.009 | 0.018 | 0.009 | 0.003 | 0.002 | 0.000 | 0.014 | 0.038 | Balance | ○ |
| 23 | 38.2 | 3.80 | 0.0062 | 0.0007 | 0.0003 | 0.0072 | 0.009 | 0.003 | 0.002 | 0.014 | 0.007 | 0.003 | 0.003 | 0.000 | 0.013 | 0.024 | Balance | X |
| 24 | 37.6 | 3.79 | 0.0002 | 0.0044 | 0.0002 | 0.0048 | 0.008 | 0.005 | 0.015 | 0.028 | 0.009 | 0.002 | 0.003 | 0.000 | 0.014 | 0.036 | Balance | ○ |
| 25 | 38.5 | 3.80 | 0.0002 | 0.0061 | 0.0003 | 0.0066 | 0.018 | 0.003 | 0.001 | 0.022 | 0.006 | 0.006 | 0.002 | 0.000 | 0.014 | 0.039 | Balance | X |
| 26 | 37.9 | 3.90 | 0.0003 | 0.0030 | 0.0028 | 0.0061 | 0.015 | 0.003 | 0.015 | 0.033 | 0.006 | 0.005 | 0.001 | 0.000 | 0.012 | 0.022 | Balance | ○ |
| 27 | 38.1 | 3.78 | 0.0005 | 0.0020 | 0.0039 | 0.0064 | 0.022 | 0.002 | 0.016 | 0.040 | 0.005 | 0.006 | 0.002 | 0.000 | 0.013 | 0.028 | Balance | X |
| 28 | 37.9 | 3.78 | 0.0028 | 0.0042 | 0.0037 | 0.0107 | 0.019 | 0.005 | 0.023 | 0.047 | 0.009 | 0.002 | 0.001 | 0.000 | 0.012 | 0.019 | Balance | X |
| 29 | 37.9 | 3.80 | 0.0007 | 0.0008 | 0.0005 | 0.0020 | 0.041 | 0.001 | 0.003 | 0.045 | 0.008 | 0.005 | 0.001 | 0.000 | 0.014 | 0.028 | Balance | ○ |
| 30 | 38.2 | 3.85 | 0.0008 | 0.0009 | 0.0003 | 0.0020 | 0.055 | 0.003 | 0.004 | 0.062 | 0.009 | 0.003 | 0.008 | 0.000 | 0.020 | 0.039 | Balance | X |
| 31 | 37.8 | 3.77 | 0.0016 | 0.0007 | 0.0003 | 0.0026 | 0.011 | 0.018 | 0.015 | 0.044 | 0.008 | 0.001 | 0.004 | 0.000 | 0.013 | 0.022 | Balance | ○ |
| 32 | 38.0 | 3.80 | 0.0012 | 0.0012 | 0.0004 | 0.0028 | 0.001 | 0.023 | 0.013 | 0.037 | 0.009 | 0.004 | 0.001 | 0.000 | 0.014 | 0.018 | Balance | X |
| 33 | 37.6 | 3.81 | 0.0002 | 0.0009 | 0.0005 | 0.0016 | 0.001 | 0.005 | 0.043 | 0.049 | 0.011 | 0.001 | 0.001 | 0.000 | 0.013 | 0.036 | Balance | ○ |
| 34 | 38.1 | 3.79 | 0.0003 | 0.0009 | 0.0007 | 0.0019 | 0.002 | 0.002 | 0.058 | 0.062 | 0.013 | 0.002 | 0.003 | 0.000 | 0.018 | 0.033 | Balance | X |
| 35 | 38.5 | 3.82 | 0.0004 | 0.0007 | 0.0006 | 0.0017 | 0.026 | 0.011 | 0.021 | 0.058 | 0.007 | 0.006 | 0.006 | 0.000 | 0.019 | 0.024 | Balance | X |
| 36 | 39.0 | 3.78 | 0.0003 | 0.0005 | 0.0005 | 0.0013 | 0.003 | 0.001 | 0.004 | 0.008 | 0.023 | 0.002 | 0.003 | 0.000 | 0.028 | 0.022 | Balance | ◎ |
| 37 | 37.9 | 3.77 | 0.0002 | 0.0002 | 0.0006 | 0.0010 | 0.005 | 0.003 | 0.004 | 0.012 | 0.029 | 0.009 | 0.002 | 0.000 | 0.040 | 0.017 | Balance | Δ |
| 38 | 37.3 | 3.83 | 0.0005 | 0.0003 | 0.0002 | 0.0010 | 0.006 | 0.006 | 0.003 | 0.015 | 0.011 | 0.016 | 0.002 | 0.000 | 0.029 | 0.033 | Balance | ○ |
| 39 | 37.6 | 3.81 | 0.0005 | 0.0002 | 0.0001 | 0.0008 | 0.001 | 0.004 | 0.002 | 0.007 | 0.009 | 0.025 | 0.003 | 0.000 | 0.037 | 0.032 | Balance | Δ |
| 40 | 38.0 | 3.80 | 0.0005 | 0.0009 | 0.0012 | 0.0026 | 0.002 | 0.002 | 0.007 | 0.011 | 0.001 | 0.003 | 0.025 | 0.000 | 0.029 | 0.030 | Balance | ○ |
| 41 | 38.6 | 3.78 | 0.0004 | 0.0012 | 0.0012 | 0.0028 | 0.004 | 0.003 | 0.006 | 0.013 | 0.003 | 0.003 | 0.045 | 0.000 | 0.051 | 0.290 | Balance | X |
| 42 | 37.6 | 3.79 | 0.0003 | 0.0010 | 0.0009 | 0.0022 | 0.004 | 0.003 | 0.006 | 0.013 | 0.003 | 0.005 | 0.001 | 0.024 | 0.033 | 0.029 | Balance | ○ |
| 43 | 38.0 | 3.84 | 0.0002 | 0.0009 | 0.0011 | 0.0022 | 0.003 | 0.003 | 0.004 | 0.010 | 0.005 | 0.004 | 0.009 | 0.037 | 0.055 | 0.040 | Balance | Δ |
| 44 | 38.0 | 3.78 | 0.0004 | 0.0007 | 0.0001 | 0.0012 | 0.006 | 0.019 | 0.012 | 0.037 | 0.011 | 0.002 | 0.003 | 0.006 | 0.022 | 0.022 | Balance | X |
| 45 | 38.1 | 3.82 | 0.0005 | 0.0019 | 0.0012 | 0.0036 | 0.005 | 0.001 | 0.001 | 0.009 | 0.005 | 0.007 | 0.002 | 0.003 | 0.017 | 0.032 | Balance | X |
| 46 | 37.8 | 3.82 | 0.0005 | 0.0007 | 0.0002 | 0.0014 | 0.018 | 0.002 | 0.004 | 0.024 | 0.005 | 0.005 | 0.007 | 0.024 | 0.041 | 0.025 | Balance | ○ |

As clearly shown in Table 2 and Table 3, a partial replacement of the Cr component with a moderate amount of at least one element selected from Zr, Hf, V, Nb, Ta, Mo, and W increased the hardness of the alloy and improved the blade durability. In other words, even after the cut operation of the hemp rope was repeated 1,000 times, the horizontal moving distance of the knife required for cutting the rope was small and the cutting quality was satisfactorily maintained. However, the results also showed that an excessive replacement impaired the hot workability of the blank for the cutters, increased chipping of the blade, and deteriorated the blade durability.

As clearly shown in Sample Nos. 19 to 21 in Table 2, when Al in a base alloy composed of 38% Cr-3.8% Al-balance Ni was partly replaced with Ti, the hardness of the alloy was increased after solution treatment, and the cutting work became difficult to achieve. In this case, there was an advantage that it was difficult to generate flaws in the polishing process for mirror finish, but the hardness was not significantly improved. However, an excessive addition of Ti deteriorated the hot workability, and in addition, caused excessive hardening that impaired the machinability after solution treatment. Accordingly, the replacement ratio of Ti is preferably 1.2 mass percent or less, and more preferably, 0.5 mass percent or less.

Unlike the known knife composed of a stainless steel having martensitic structure in which carbides are finely dispersed, even when the knives according to the Examples of the present invention are exposed to a high temperature, i.e., 400° C. or less, for a long time, the hardness is barely decreased. Therefore, aging of characteristics of the cutters can be suppressed. In contrast, when the known knife composed of the stainless steel is exposed at a temperature of 200° C. or more, unfortunately, the hardness is gradually decreased. After being kept at 400° C. for three hours, the hardness of the knives according to the present invention was barely changed, whereas the hardness of the known knife composed of the stainless steel was decreased by about 20%. In view of this thermal deterioration resistance, in particular, the cutters of the present invention are preferably used as cutters that repeatedly require sterilization treatment at a high temperature, for example, cutters for medical use such as a surgical knife, cooking cutters, cutters for food machines, and scissors for barbers. Also, the cutters of the present invention are preferably used as cutters for woodworking, cutters for drills, cutters for end mills, and cutters for turning. Even when the cutters are exposed to a high heat by rubbing with a processing object, the cutters of the present invention can be preferably used in such applications. The use of cutters of the present invention can suppress the decrease in the hardness and the decrease in the cutting quality due to the heat.

Example 8

Figure 7:
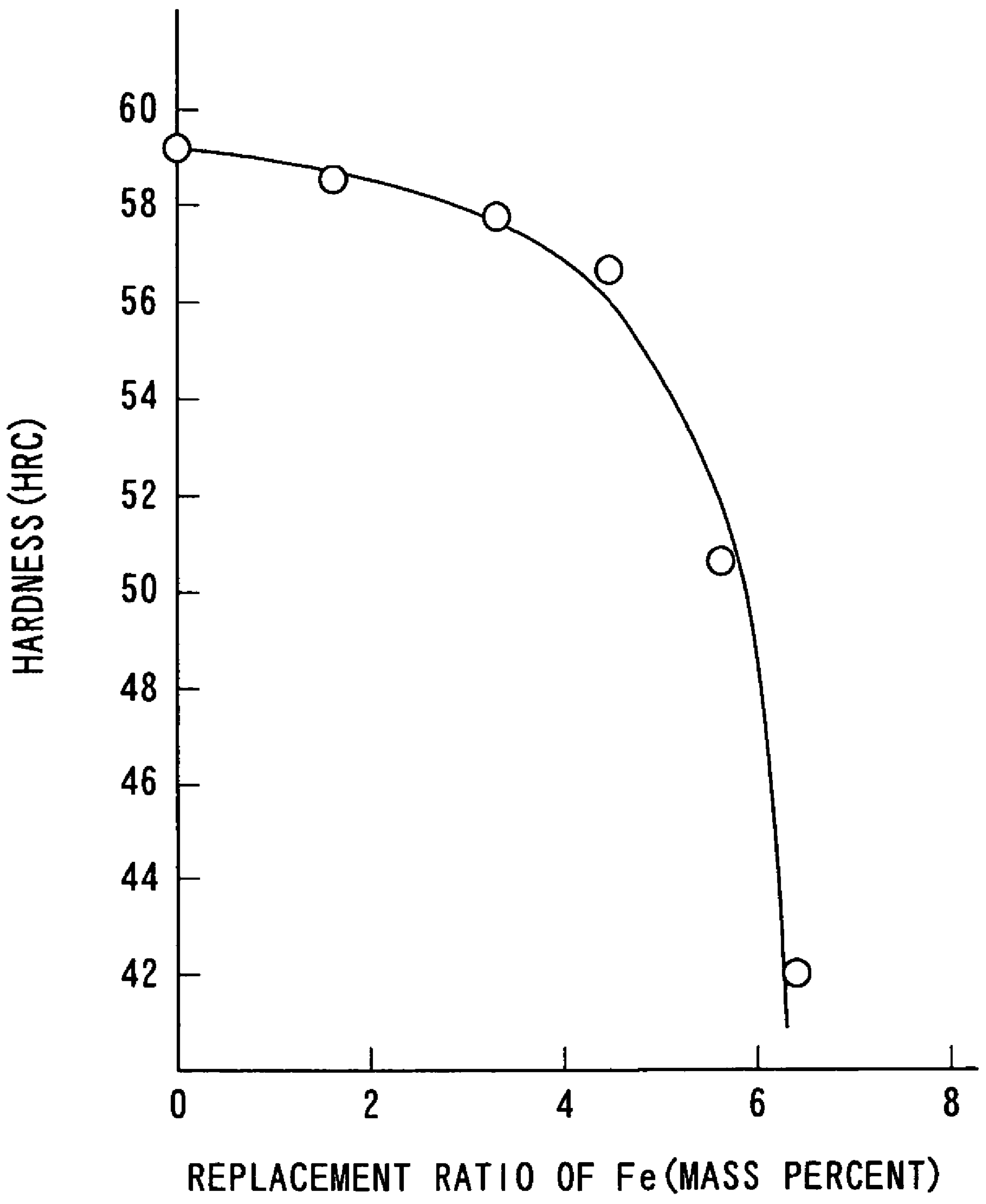
FIG. 7 is a graph showing a relationship between a replacement ratio of Fe and the hardness of a knife, which is an example of a cutter, in an alloy forming the cutter according to Example 8.

Alloys were produced by partly replacing Ni in an alloy composed of 38 mass percent Cr-3.8% Al-balance Ni with Fe. The replacement ratio of Fe was varied. The alloys were subjected to machining and heat treatment as in Example 1 to prepare knives having the same dimensions as that in Example 1. The surface hardness of the knives was measured with a Rockwell hardness tester to investigate the effect of the replacement ratio of Fe on the hardness of the knives. FIG. 7 shows the result.

As clearly shown in FIG. 7, when the replacement ratio of Fe was 5 mass percent or less, the hardness specified in the present invention (i.e., $H_{RC}$52 or more) was maintained. On the other hand, when the replacement ratio of Fe exceeded 5 mass percent, the hardness of the knife was drastically decreased. Such an excessive replacement is not preferable because basic characteristics such as the blade durability are deteriorated. Accordingly, when the replacement ratio of Fe is 5 mass percent or less, the consumption of expensive Ni can be decreased without impairing the characteristics of the cutters. As a result, the material cost of the cutters can be significantly decreased.

In order to evaluate cold resistance of the cutters of the present invention, Charpy impact values of the knife, i.e. cutter, prepared in Example 1 were measured at normal temperature (25° C.) and a low temperature (−30° C.). The following Table 3 shows the results. The Charpy impact values were measured using a No. 3 test piece (a test piece having a U-notch) according to the Charpy impact test (JIS-Z-2242).

TABLE 4

| | Charpy Impact Value | |
|---|---|---|
| Sample No. | Normal Temperature(25° C.) | Low Temperature(−30° C.) |
| Example 1 | $8.5 \times 10^4$ J/m$^2$ | $8.2 \times 10^4$ J/m$^2$ |

As clearly shown in Table 4, even when the knife according to Example 1 was used at a very low temperature (−30° C.), for example, in a polar region, the decrease in Charpy impact value was small. Therefore, this knife is very useful in special purposes, for example, a knife for frozen foods, a cutter for machines used at low temperatures, and a knife used in cold areas, in which strength and toughness at low temperatures are essential and important.

Although the cutters prepared in the above Examples were contacted with a magnet, the attachment due to the magnetic force did not occur in all the cutters. This result indicated that all the cutters were confirmed to be substantially nonmagnetic (when a magnetic field of 79.6 kA/m was applied, the relative magnetic permeability was 10 or less). Accordingly, even when used in a magnetic field, the cutters according to the Examples are not affected by the magnetic field and provide precise cutting operations.

Since known cutters composed of iron-based alloys such as stainless steels are composed of a magnetic material, it is difficult to use such cutters under an environment including a magnetic field, for example, in a medical facility. Alternatively, ceramics cutters and cutters composed of nonmagnetic cemented carbides are used in such an environment. However, such cutters have a poor cutting quality, compared with the cutters composed of the iron-based alloys. Unfortunately, precise cutting operations are difficult to achieve.

Specifically, when an operation is performed while a tomogram of a human body is observed using a superconducting magnetic resonance imaging (MRI) equipment including a magnetic coil, surgical knives or dissection scissors composed of a nonmagnetic alloy material in the Examples are preferably used. The surgical knives or dissection scissors are not magnetized by the magnetic field and the motion of the cutter is not affected by the magnetic field. The cutters in the Examples provide precise cutting operation, which is a remarkable advantage.

Furthermore, camping knives may be formed by combining a knife body composed of a nonmagnetic alloy material in the Examples with a compass. Since the knife body is not magnetized, the compass accurately works for a long time. Thus, knife tools having high reliability can be produced for the first time. In addition, the nonmagnetic alloy materials in the Examples may be used as drilling knives for a land-mine remover using a magnetometer. The use of such knives prevents an explosion of a land-mine caused by the magnetism and significantly improves the safety of the removal operation.

In known cutters used for perforating a metal foil, a plastic film, or a package, or in known cutters used for repeatedly cutting, for example, cereals in which metal pieces such as a nail are readily mixed, impurities such as metal pieces are attached to the blade edge by magnetization. Unfortunately, the subsequent cutting operation in this state causes chipping of the blade and decreases the cutting quality. On the other hand, the use of cutters composed of a nonmagnetic alloy material in the Examples can solve the above problems, i.e., chipping of the blade and the decrease in the cutting quality due to the impurities.

The relationships between the alloy compositions in the present invention and the characteristics of the cutters have been described in the above Examples and Comparative Examples. Table 5 summarizes the comparison of the characteristics between known high grade knives composed of a 14Cr-4Mo stainless steel and knives compose of an alloy in the above Examples.

TABLE 5

| | | Known Knives Composed of Stainless Steel (14Cr—4Mo) | Knives of the Examples |
|---|---|---|---|
| Factors that Affect Blade Durability | ① Hardness ($H_{RC}$) | 59~62 | 58~65 |
| | ② Toughness | ○ | ◎ |
| | ③ Durability of Cutting Quality | ○ | ◎ |
| Ease of Sharpening | | Δ | ○ |
| Corrosion Resistance | | ○ (Rust is Sometimes Generated in Saline Water.) | ◎ |
| Workability | Grinding | Δ | ◎ |
| | Polishing | Δ | ◎ |
| | Mirror Finish | ○ | ◎ |
| Heat Treatment Before Working (By Blank Manufacturer) | | Annealing (800~870° C. Slow Cooling) | Solution Heat Treatment (1200° C.) → Quenching (Oil Quenching) |
| Heat Treatment | ① Quenching | In Vacuum or in Argon 1040~1090° C. Oil Quenching | Quenching is not required. |
| | ② Quenching Crack | ○ | None |
| | ③ Quenching Distortion | ○ | Very Few |

TABLE 5-continued

| | Known Knives Composed of Stainless Steel (14Cr—4Mo) | Knives of the Examples |
|---|---|---|
| ④Tempering | 100~150° C. × 3H | Aging Treatment In Vacuum or in Hydrogen 600~700° C. × 1~3H The cooling rate to room temperature after the treatment is not particularly regulated. |
| ⑤Cost | Δ | ◎ |
| Low-Temperature Embrittlement Resistance | x | ◎ |
| Color.Luster (After Mirror Finishing Polishing) | Silver-Gray | High Grade Silver-White |
| Other Features | | ①During brazing a hilt (flange), the hardness of the heated part is not significantly decreased. ②When the crystal grain is fine, superplastic forming can be performed. ③In the application wherein knives are sterilized by heating, even when, for example, knives for medical use are heated at 300° C., the hardness is not significantly decreased. |

As shown in the above Table 5, the hardness ($H_{RC}$) at normal temperature is not significantly different between the known knives composed of the stainless steel and the knives of the Examples. However, toughness of the knives, durability of cutting quality, and ease of sharpening are improved depending on the combinations of compositions and the hardness in the above Examples.

In an immersion test in sea water and saline water, pitting corrosion and rust are sometimes generated in the known knives composed of the stainless steel. In contrast, pitting corrosion and rust are barely generated in the knives of the Examples. Accordingly, the alloys forming the cutters of the Examples are preferably used as cutters for fishery machines, knives for divers, and cooking knives. Since rust such as crevice corrosion and pitting corrosion is barely generated, the cutters of the Examples are advantageous in view of good hygiene. In addition, since the metallic luster is maintained for a long time, the cutters of the Examples are excellent in aesthetic property.

Furthermore, because of the moderate hardness and viscosity, the alloys forming the knives of the above Examples can be smoothly ground and polished, and a mirror finished surface can be readily formed. In addition, before shipment from a blank factory, a blank of a stainless steel used for the known knives is annealed at 800° C. to 870° C. and is then cooled slowly. In contrast, before shipment, the alloys used for the Examples are subjected to solution heat treatment at 1,200° C. and are then quenched. Thus, the blanks used for the Examples can also be produced by simplified steps.

Furthermore, the process for producing the known knives composed of the stainless steel essentially requires at least two heat treatments, i.e., quenching and tempering. Unfortunately, such a heat treatment often causes defects such as quenching crack and quenching distortion. In contrast, since the process for producing the knives of the Examples does not require quenching, this process barely causes the defects such as quenching crack and quenching distortion. In addition, since the predetermined hardness can be provided in a single aging treatment, the production process is significantly simplified. Thus, the production cost of the cutters can be drastically decreased.

According to the Ni—Cr alloys forming cutters of the present invention, heat treatment at 640° C. to 660° C. provides the highest hardness and improves the durability of the cutting quality of the blade edge part. According to the Ni—Cr alloys forming cutters of the present invention, heat treatment at 670° C. to 800° C. decreases the hardness but improves the value of toughness to decrease chipping of the blade. Also, in heat treatment of the cutter, the temperature at the blade edge part may be controlled in the range of 640° C. to 660° C., whereas the temperature at the blade body (blade back part), i.e., the part other than the blade edge, may be controlled in the range of 670° C. to 800° C. This heat treatment provides a cutter having both superior cutting quality and superior structural strength.

As described above, even when the knives of the present invention are used at a very low temperature (−30° C.), the decrease in Charpy impact value is small. Therefore, the knives of the present invention are preferably used as knives used in cold areas, knives for frozen foods, and cutters for machines used at low temperatures. On the other hand, because of significant low-temperature embrittlement, the known knives composed of the stainless steel cannot generally be used in cold areas.

Although the blank cost of the known knives composed of the stainless steel is lower than that of the knives of the Examples by 20% to 30%, the mirror finished surface of the known knives has silver-gray and poor decorative property. In contrast, the knives of the Examples have silver-white having a high grade feeling. Because of the beautiful color and luster, consumers will be more eager to buy the knives of the Examples.

Furthermore, the Ni—Cr alloys forming cutters of the present invention has special features: Fats and sticky substances are difficult to attach to the Ni—Cr alloys, and the cutting quality of the cutters can be maintained for a long time. Accordingly, when the cutters composed of the alloys are used as knives for processing meats, surgical knives, dissection scissors, cutters for cutting adhesive tapes, scissors for cutting adhesive tapes, and camping knives, superior cutting quality can be maintained for a long time.

Although the cutters in the above Examples are produced using a solid material composed of Ni—Cr alloy having high hardness, the present invention is not limited to the above Examples. For example, a cutter may be produced using a cladding material. In the cladding material, the Ni—Cr alloy having high hardness is used as a core metal, and a different metallic material, i.e., a cladding metal, having superior corrosion resistance and high toughness is bonded with at least one side face of the core metal. More specifically, the cutter may be produced using a cladding material in which a cladding metal composed of an austenitic stainless steel or a titanium alloy is bonded with the side face of a core metal composed of the above Ni—Cr alloy. The above cutter is composed of the cladding material in which the above different metallic material having high toughness is bonded as the cladding metal. As a result, this structure can increase the toughness of the whole cutter and significantly increase the workability to form the cutter and durability of the cutter.

INDUSTRIAL APPLICABILITY

As described above, the cutter according to the present invention is composed of a Ni—Cr alloy containing predetermined amounts of Cr and Al and having a Rockwell C hardness of 52 or more. As a result, the alloy particularly has a superior workability, and the production process of the cutter can be significantly simplified. Furthermore, the present invention provides an inexpensive cutter having a low deterioration in the hardness even when heated in use, having excellent corrosion resistance and low-temperature embrittlement resistance, and satisfactorily maintaining the cutting performance for a long time.

The invention claimed is:

1. A cutter comprising a Ni—Cr alloy comprising:

from 32 to 44 mass percent of Cr, from 2.3 to 6 mass percent of Al, the balance being Ni, impurities, and additional trace elements, and wherein the cutter has a Rockwell C hardness of 52 or more, and wherein the Ni—Cr alloy further comprises:

from 0.005 to 0.025 mass percent of Mg;

from 0.005 to 0.02 mass percent of Ca;

from 0.005 to 0.03 mass percent of B; and from 0.005 to 0.02 mass percent of rare earth elements including Y; as the impurities and the additional trace elements, and wherein the total content of Mg, Ca, and B is greater than 0.015 and less than or equal to 0.03 mass percent, the total content of P, O, and S is greater than zero and less than or equal to 0.003 mass percent and the total content of Mn, Cu and Si is greater than zero and less than or equal to 0.03 mass percent, wherein the Ni—Cr alloy comprises a texture comprising a mixture of a Cr-rich $\alpha$ phase, a Ni-rich phase $\gamma$ phase, and an intermetallic compound phase composed of $Ni_3Al$ as a basic composition $\gamma$ phase and the Ni—Cr alloy has an average grain size of 1 mm or less, wherein the cutter comprises a mirror-finished surface formed by final polishing with a polisher, so that the cutter has an aesthetic property, and wherein a moving distance of the cutter required for completely cutting a hemp rope is doubled or less compared with an initial state of the cutter even after 1,000 cut operations are performed when a rope cut test is performed under conditions that a linear blade part of the cutter is pressed on a hemp rope having a diameter of 10 mm and the cutter is reciprocated in the horizontal direction while a load of 2 kg is applied to the cutter whereby the moving distance of the cutter required for completely cutting the hemp rope is repeatedly measured.

* * * * *